United States Patent [19]

Newell

[11] Patent Number: 5,048,920

[45] Date of Patent: Sep. 17, 1991

[54] FIBER TO FIBER CONNECTION

[75] Inventor: Edwin R. Newell, Wake Forest, N.C.

[73] Assignee: Square D Company, Palatine, Ill.

[21] Appl. No.: 433,940

[22] Filed: Nov. 9, 1989

Related U.S. Application Data

[63] Continuation-in-part of Ser. No. 242,359, Sep. 9, 1988, Pat. No. 4,911,517.

[51] Int. Cl.⁵ ............................................. G02B 6/38
[52] U.S. Cl. ..................................................... 385/55
[58] Field of Search ........................... 350/96.20, 96.21

[56] References Cited

U.S. PATENT DOCUMENTS

| | | | |
|---|---|---|---|
| 4,767,181 | 8/1988 | McEowen | 350/96.21 |
| 4,779,952 | 10/1988 | Hayashi et al. | 350/96.21 |
| 4,787,701 | 11/1988 | Stenger et al. | 350/96.21 |
| 4,789,218 | 12/1988 | Paul et al. | 350/96.21 |
| 4,793,683 | 12/1988 | Cannon et al. | 350/96.21 |
| 4,795,231 | 1/1989 | Tanabe | 350/96.21 |

Primary Examiner—William L. Sikes
Assistant Examiner—Robert E. Wise
Attorney, Agent, or Firm—Michael J. Femal; James Earl Lowe, Jr.

[57] ABSTRACT

A fiber to fiber connection comprising a first optical fiber end, a second optical fiber end, and a connector housing. The connector housing has a connection chamber, a first fiber inlet passage which communicates with the connection chamber and which snugly but slidably receives the first fiber end, and a second fiber inlet passage which communicates with the connection chamber and which slidably receives the second fiber end. The fiber to fiber connection further comprises a shuttle slidably received within the connection chamber and movable between a first fiber connecting position and a second position. The shuttle has a fiber receiving end, and a connection end housing the second fiber end and snugly but slidably received within the first fiber inlet passage so that the second fiber end faces the first fiber end. The fiber to fiber connection further comprises a spring for biasing the shuttle toward the first fiber inlet passage from the first fiber connecting position to the second position. The fiber to fiber connection further comprises a slot and clamp for fixing the first fiber end within the first fiber inlet passage with the first fiber end adjacent the shuttle connection end and with the shuttle held by the first fiber end in the first fiber connecting position so that the first fiber end is held in compression against the second fiber end.

7 Claims, 2 Drawing Sheets

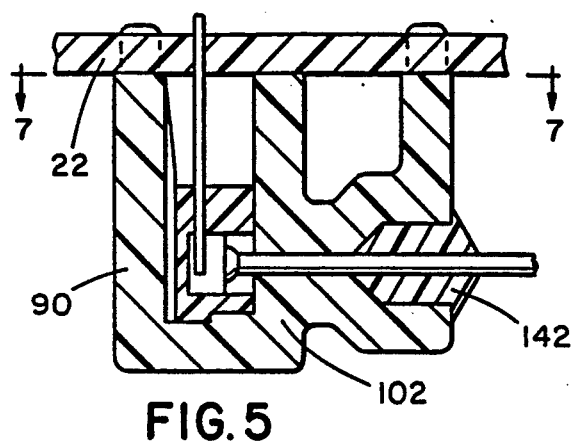
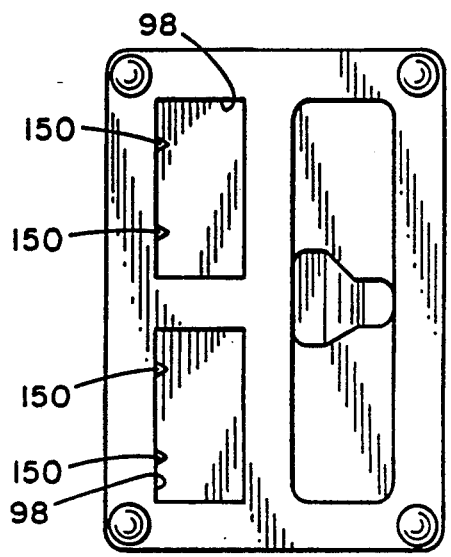
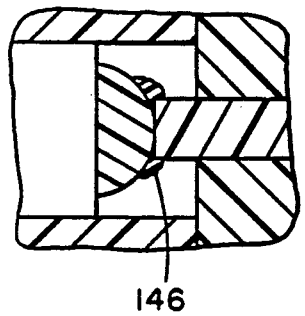
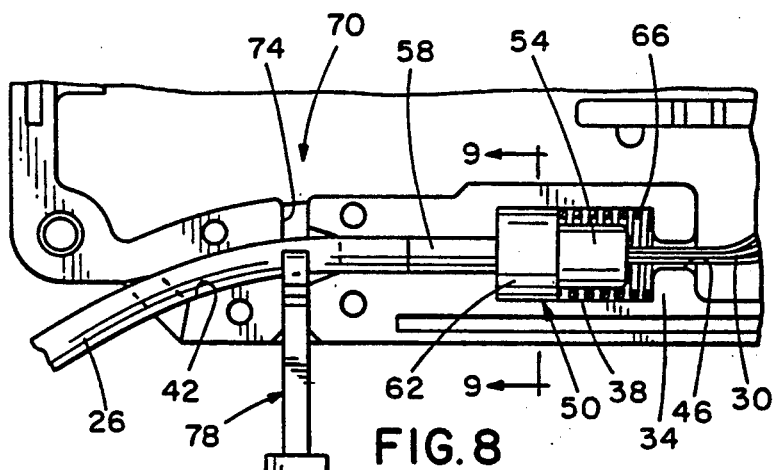
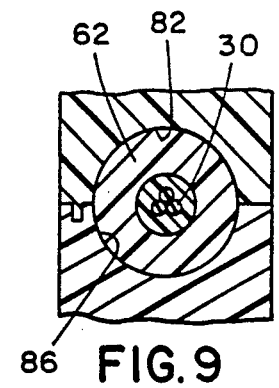
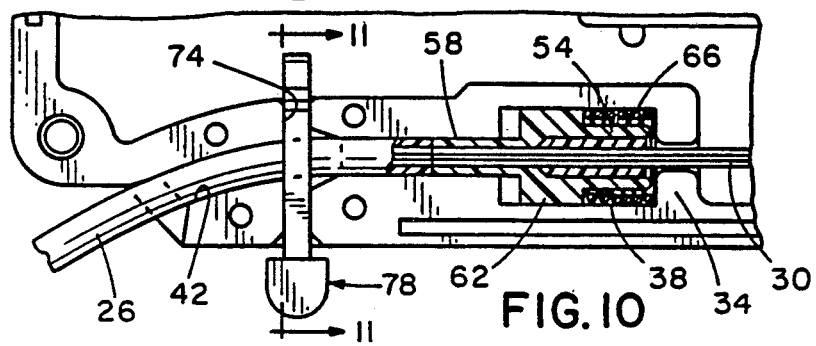
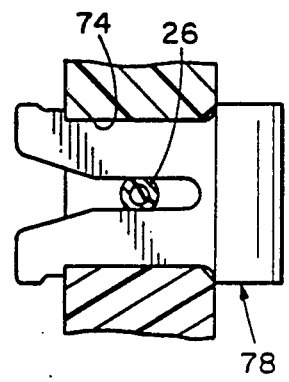

FIBER TO FIBER CONNECTION

RELATED APPLICATION

This application is a continuation-in-part of U.S. Newell et al. patent application Ser. No. 07/242,359 filed Sept. 9, 1988, now U.S. Pat. No. 4,911,517.

FIELD OF THE INVENTION

This invention relates to connections and couplers for connecting optical fibers to other optical fibers and to printed circuit boards. Previous methods of coupling two or more optical fibers together have required that the ends being connected have a factory or field installed sleeve, shuttle or other form of guiding and biasing method installed on the fiber end. In most instances, the fiber ends are installed in mating housing halves which provide the biasing and fixing means of the connection by eliminating many parts, reducing manufacturing time and reducing the time required to connect an optical fiber to the device at the point of use.

SUMMARY OF THE INVENTION

This invention includes a fiber to fiber connection comprising a first optical fiber end, a second optical fiber end, and a connector housing. The connector housing has a connection chamber, a first fiber inlet passage which communicates with the connection chamber and which snugly but slidably receives the first fiber end, and a second fiber inlet passage which communicates with the connection chamber and which slidably receives the second fiber end.

The fiber to fiber connection further comprises a shuttle slidably received within the connection chamber and movable between a first fiber connecting position and a second position. The shuttle has a fiber receiving end, and a connection end housing the second fiber end and snugly but slidably received within the first fiber inlet passage so that the second fiber end faces the first fiber end.

The fiber to fiber connection further comprises means for biasing the shuttle toward the first fiber inlet passage from the first fiber connecting position to the second position.

The fiber to fiber connection further comprises means for fixing the first fiber end within the first fiber inlet passage with the first fiber end adjacent the shuttle connection end and with the shuttle held by the first fiber end in the first fiber connecting position so that the first fiber end is held in compression against the second fiber end.

In one embodiment, a plurality of second fiber ends are slidably received in the second fiber inlet passage and each of the second fiber ends is housed by the shuttle connection end so that each of the second fiber ends face the first fiber end and so that the first fiber end is held in compression against all of the second fiber ends.

One of the features of the invention is the provision of an easy to assemble optical fiber to optical fiber connection. The ease and simplicity of the connection is made possible by the acceptance of any optical fiber of a diameter slidably passable in the first optical fiber inlet passage. A sleeve, shuttle or any other factory or field installed device such as a housing which must mate with a portion of the connector housing prior to insertion of the optical fiber is not required. This connection insures a good fiber to fiber interface with substantially all of the light passing from fiber to fiber.

Another feature of the invention is the provision of such a connection wherein a number of fibers can be connected to a single fiber in an easy to assemble manner with a high degree of reliability.

Other features and advantages of the invention will become apparent to those skilled in the art upon review of the
following detailed description, claims and drawings.

BRIEF DESCRIPTION OF THE DRAWINGS

FIG. 5 is a cross sectional view of the coupler illustrated in FIG. 2 taken along the line 5—5 in FIG. 2.

FIG. 6 is an exploded view illustrating the fiber end to lens junction in the coupler illustrated in FIG. 4.

FIG. 7 is a side view of a coupler housing used to construct the coupler illustrated in FIG. 2. The coupler housing is viewed from along the line 7—7 in FIG. 5.

FIG. 8 is a top view of the fiber to fiber connection which is illustrated in FIG. 1 and which embodies various of the features of the invention. The connection includes a coupler housing and is shown with a first fiber end only partially inserted and with a shuttle in its second position.

FIG. 9 is a cross sectional view of the shuttle and the coupler housing taken along the line 9—9 in FIG. 8.

FIG. 10 is top view of the fiber to fiber connection with the first fiber end fully inserted and with the shuttle in its first fiber connecting position.

FIG. 11 is a cross sectional view of a clamp used to grasp the first fiber end and fix it to the coupler housing taken along the line 11—11 in FIG. 10.

Figure 1:
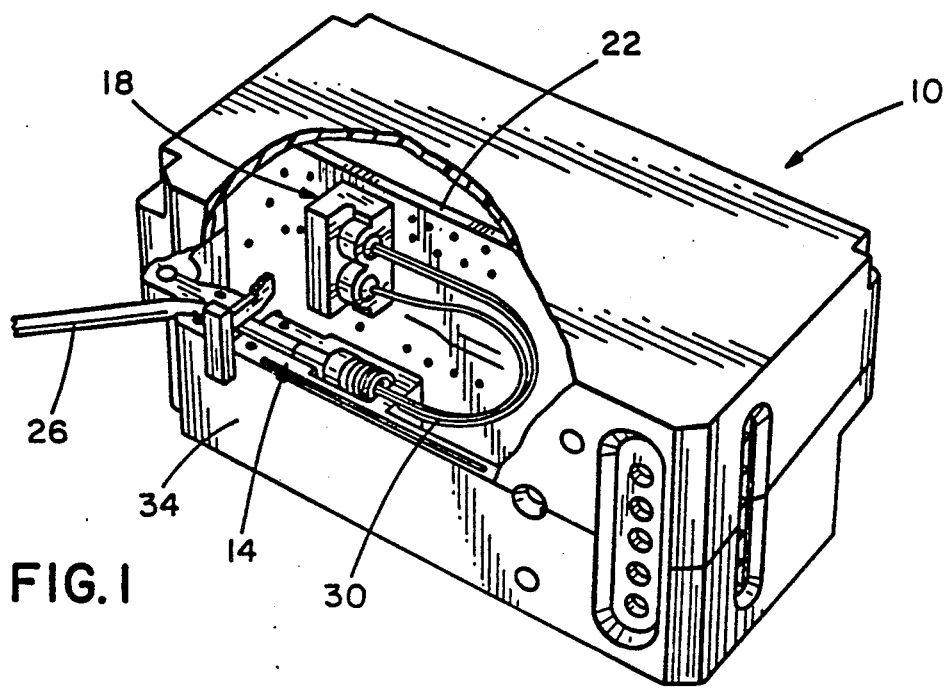
FIG. 1 is a perspective view, partially broken away, of a fiber optical transceiver which embodies various of the features of the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT OF THE INVENTION

Illustrated in the drawings is a fiber optic transceiver 10 for transmitting and receiving optical pulses. The transceiver 10 includes a fiber to fiber connection 14, an optical fiber coupler 18, and a conventional transceiver processing and indicating means including a printed circuit board 22.

More particularly, the fiber to fiber connection 14 includes a first optical fiber end 26, a second optical fiber end 30, and a connector housing 34. The connector housing 34 has a connection chamber 38 (see FIG. 8), a first fiber inlet passage 42 which communicates with the connection chamber 38 and which snugly but slidably receives the first fiber end 26, and a second fiber inlet passage 46 which communicates with the connection chamber 38 and which slidably receives the second fiber end 30. The second fiber inlet passage 46 enters the connection chamber 38 on a side opposite from the first fiber inlet passage 42. The fiber to fiber connection 14 further includes a shuttle slidably received within the connection chamber 38 and movable between a first fiber connecting position (see FIG. 10) and a second position (see FIG. 8). The shuttle 50 has a fiber receiving end 54, and a connection end 58 housing the second fiber end 30. The connection end 58 is snugly but slidably received within the first fiber inlet passage 42 so that the second fiber end 30 faces the first fiber end 26. More particularly, there are a plurality of second fiber ends 30 slidably received in the second fiber inlet passage 46 and each of the second fiber ends 30 is housed by the shuttle connection end 58 so that each of the second fiber ends 30 face the first fiber 26 and so that the first fiber end 26 is held in compression against all of the second fiber ends 30. In the preferred embodiment, the second fiber ends 30 are fixed in the connection end 58 with epoxy, and the connection end 58 is ground down to where each of the fiber ends 30 are flush with the connection end 58.

The fiber to fiber connection 14 further includes means for biasing the shuttle 50 toward the first fiber inlet passage 42 from the first fiber connecting position (FIG. 10) to the second position (FIG. 8). More particularly, the shuttle 50 has an enlarged middle 62 between the fiber receiving end 54 and the connection end 58, and the biasing means comprises a compression spring 66 concentric about the fiber receiving end 54, the spring 66 having one end bearing against the connector housing 34 and another end bearing against the shuttle middle 62.

The fiber to fiber connection 14 further includes means 70 for fixing the first fiber end 26 within the first fiber inlet passage 42 with the first fiber end 26 adjacent the shuttle connection end 58 and with the shuttle 50 held by the first fiber end 26 in the first fiber connecting position (FIG. 10) so that the first fiber end 26 is held in compression against the second fiber end 30. More particularly, the means 70 for fixing the first fiber end 26 within the first fiber inlet passage 42 comprises a slot 74 in the connector housing 34 and extending across the first fiber inlet passage 42, and a clamp 78 received within the slot 74 and grasping the first fiber end 26.

The first fiber inlet passage 42 is curved so that the first fiber end 26 is biased by its own resiliency against a wall of the first fiber inlet passage 42 to effect a more exact registry between the first fiber end 26 and the second fiber end 30.

The connector housing 34 includes a first piece having a first piece surface 82 (see FIG. 9) and a second piece having a second piece surface 86 abutting the first piece surface 82. The first fiber inlet passage 42, the connection chamber 38, the second fiber inlet passage 46, and the slot 74 are defined by the first and the second piece surfaces.

Figure 2:
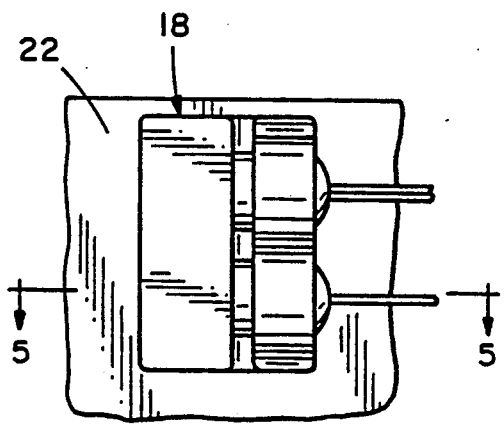
FIG. 2 is a side view of a coupler for connecting a plurality of fibers to a printed circuit board which embodies various of the features of the invention.
Figure 3:
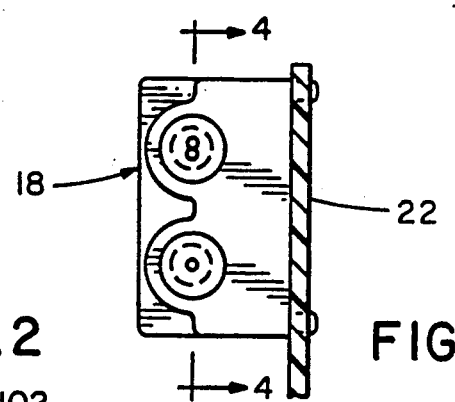
FIG. 3 is an end view of the coupler illustrated in FIG. 2.
Figure 4:
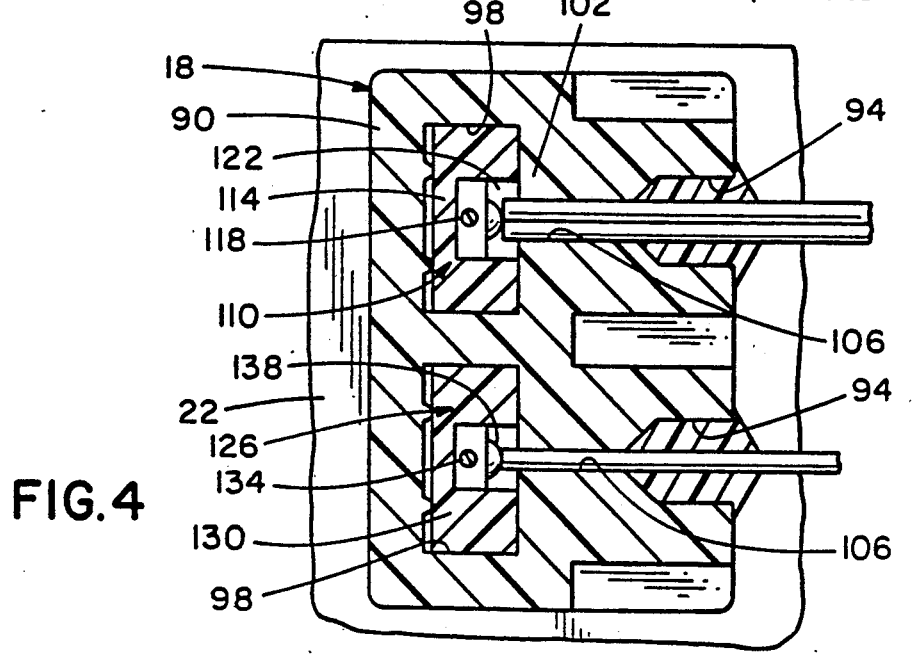
FIG. 4 is a cross sectional view of the coupler illustrated in FIG. 2 taken along the line 4—4 in FIG. 3.

As illustrated in FIGS. 2 through 7, the fibers to printed circuit board coupler 18 includes a coupler housing 90 (see FIG. 5) adapted to be connected to the printed circuit board 22. The coupler housing 90 has two spaced-apart inlet wells 94 (see FIG. 4), two spaced-apart assembly wells 98 separated from the inlet wells 94 by a coupler housing wall 102, and two fiber passages 106. Each of the fiber passages 106 snugly receives at least one of the plurality of fibers 30 and extends between a separate one of the inlet wells 94 and a separate one of the assembly wells 98. More particularly, two fibers 30 are received in one assembly well 98 and one fiber is received in the other assembly well 98.

The coupler 18 further includes a detector assembly 110 comprising a detector assembly housing 114, a detector 118 fixed within the detector assembly housing 114 and electrically connected (see FIG. 5) to the printed circuit board 22, and a detector assembly lens 122 mounted on the assembly housing 114 and in light pulse communication with the detector 118, the detector assembly 110 being fixedly received in one of the assembly wells 98 so that the detector assembly lens 122 is adjacent the fiber in the assembly well's fiber passage.

The coupler 18 further includes an emitter assembly 126 including an emitter assembly housing 130, an emitter 134 fixed within the emitter assembly housing 130 and electrically connected to the printed circuit board 22, and an emitter assembly lens 138 mounted on the emitter assembly housing 130 and in light pulse communication with the emitter 134, the emitter assembly 126 being fixedly received in another of the assembly wells 98 so that the emitter assembly lens 138 is adjacent the fiber in the assembly well's fiber passage. More particularly, as illustrated in FIGS. 5 and 7, each assembly well 98 has a plurality of crushable nibs 150 for fixedly securing each of the detector assembly 110 and the emitter assembly 126 in its respective assembly well 98.

The coupler housing 90 further includes epoxy 142 in each fiber inlet well 94 so that the fiber is secured to the coupler housing 90, and index matching gel 146 surrounding each optical fiber end to assembly lens junction so that substantially all of the light passing between the assembly lens and the fiber does not escape from the optical fiber end to assembly lens junction. The housing wall 102 keeps the indexing gel 146 from mixing with the epoxy 142.

Various features of the invention are set forth in the following claims.

I claim:

1. An optical fiber to fiber connection comprising:
   a first optical fiber end, said first fiber end being squarely and cleanly cut and having no external rigid sleeve, guide or post surrounding said first fiber end;
   a second optical fiber end, said second fiber end being squarely and cleanly cut;
   a connector housing having a connection chamber;
   a first, curved fiber inlet passage which communicates with said connection chamber and which snugly but slidably receives said first fiber end that is biased by the resiliency of the first fiber by the curved passage;
   a second fiber inlet passage which communicates with said connection chamber and which slidably receives said second fiber end;
   a shuttle slidably received within said connection chamber and movable between a first fiber connecting position and a second position, said shuttle having a fiber receiving end, and
   a connection end for housing said second fiber end, said connection end being snugly but slidably received within said first fiber inlet passage so that said second fiber end faces said first fiber end;

means for biasing said shuttle toward said first fiber inlet passage from said first fiber connection position to said second position; and means for fixing said first fiber end within said first fiber inlet passage with said first fiber end adjacent said shuttle connection end and with said shuttle held by said first fiber end in said first fiber connecting position so that said first fiber end is held in compression against said second fiber end.

2. A fiber to fiber connection in accordance with claim 1 wherein said shuttle has an enlarged middle between said fiber receiving end and said connection end, and wherein said biasing means comprises a compression spring concentric about said fiber receiving end, said spring having one end bearing against said connector housing and another end bearing against said shuttle middle.

3. A fiber to fiber connection in accordance with claim 1 wherein said means for fixing said first fiber end within said first fiber inlet passage comprises:
 a slot in said connector housing, said slot extending across said first fiber inlet passage; and
 a clamp received within said slot for grasping said first fiber end.

4. A fiber to fiber connection in accordance with claim 1 wherein said first fiber inlet passage is curved so that said first fiber end is biased by its own resiliency against a wall of said first fiber inlet passage to effect a more exact registry between said first fiber end and said second fiber end.

5. A fiber to fiber connection in accordance with claim 1 wherein a plurality of second fiber ends are slidably received in said second fiber inlet passage and each of said second fiber ends is fixed in said shuttle connection end of said shuttle so that each of said second fiber ends face said first fiber inlet passage and are flush with said shuttle connection end so that said first fiber end is held in compression against all of said second fiber ends.

6. A fiber to fiber connection in accordance with claim 1 wherein said second fiber inlet passage enters said connection chamber on a side opposite from said first fiber inlet passage.

7. A fiber to fiber connection in accordance with claim 6 wherein said connector housing includes a first piece having a first piece surface and a second piece having a second piece surface abutting said first piece surface, and wherein said first fiber inlet passage, said connection chamber, said second fiber inlet passage, and said slot are defined by said first and said second piece surfaces.

* * * * *